Sept. 7, 1948.  H. E. THOMAS  2,448,843
AUTOMATIC POWER FACTOR CONTROLLER

Filed July 27, 1945  2 Sheets-Sheet 1

Inventor
Henry E. Thomas,
By
Attorneys

Sept. 7, 1948. H. E. THOMAS 2,448,843
AUTOMATIC POWER FACTOR CONTROLLER
Filed July 27, 1945 2 Sheets-Sheet 2
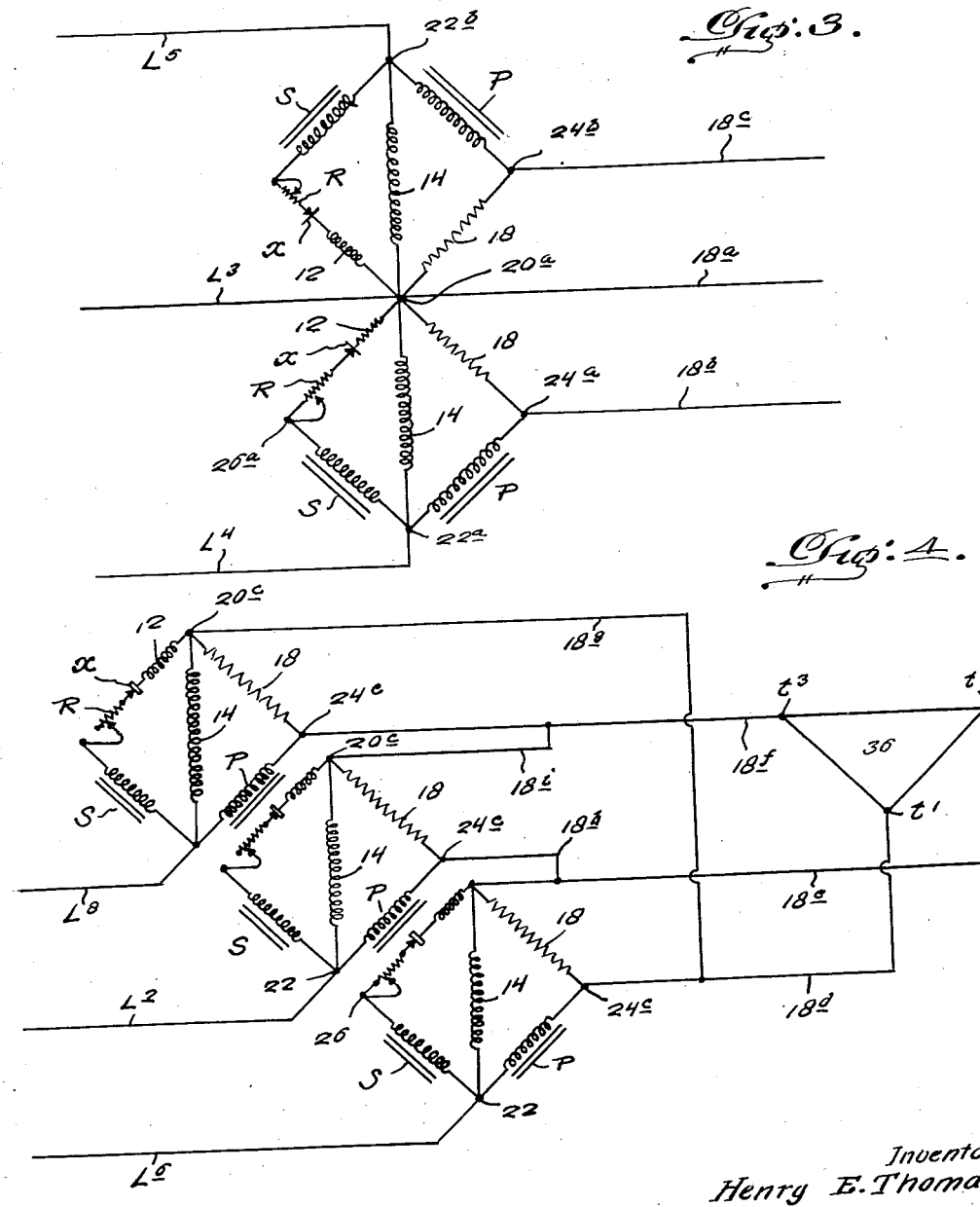
Inventor
Henry E. Thomas.

Patented Sept. 7, 1948

2,448,843

UNITED STATES PATENT OFFICE 2,448,843

AUTOMATIC POWER FACTOR CONTROLLER

Henry E. Thomas, Vallejo, Calif.

Application July 27, 1945, Serial No. 607,363

6 Claims. (Cl. 323—104)

This invention appertains to automatic power factor controllers generally, and has for one of its several objects to provide an electrical control panel and certain components so connected as to form a self-balancing bridge to secure automatic alternating current and voltage regulation and the control of the power factor over a consumer's load supply line.

Another object of the invention has to do with the provision of a controller of the kind mentioned and which will function with equal facility and efficiency on either a single phase, two phase, or a three phase, transmission line, and, in any case, a single phase alternator is employed to supply the compensating current to maintain the power factor at unity.

Specifically, the invention is comprised in a sensitive, normally balanced, bridge circuit, wherein a consumer's load current is fed through the primary of a transformer and any variations in this load will unbalance the bridge circuit and cause a corresponding change in the secondary of the transformer, the output of which is rectified and the direct current so produced is employed to excite the fields of a single phase alternator whose output is fed into the line to automatically restore the bridge circuit to balance and thus compensate for the change in voltage, current, and power factor, due to change in phase relation of the line current and voltage, caused by the original load variation.

With the foregoing and other objects and advantages in view, the invention resides in the certain new and useful combination, construction, and arrangement of parts and circuits, as will be hereinafter more fully described, set forth in the appended claims, and illustrated in the accompanying drawings, in which:

Figure 3 is a view similar to that of Figure 2, but showing a bridge arrangement to operate on a two phase consumer's service line; and Figure 4 is another similar view, but showing a bridge arrangement for use on a three phase consumer's service line.

Figure 1:
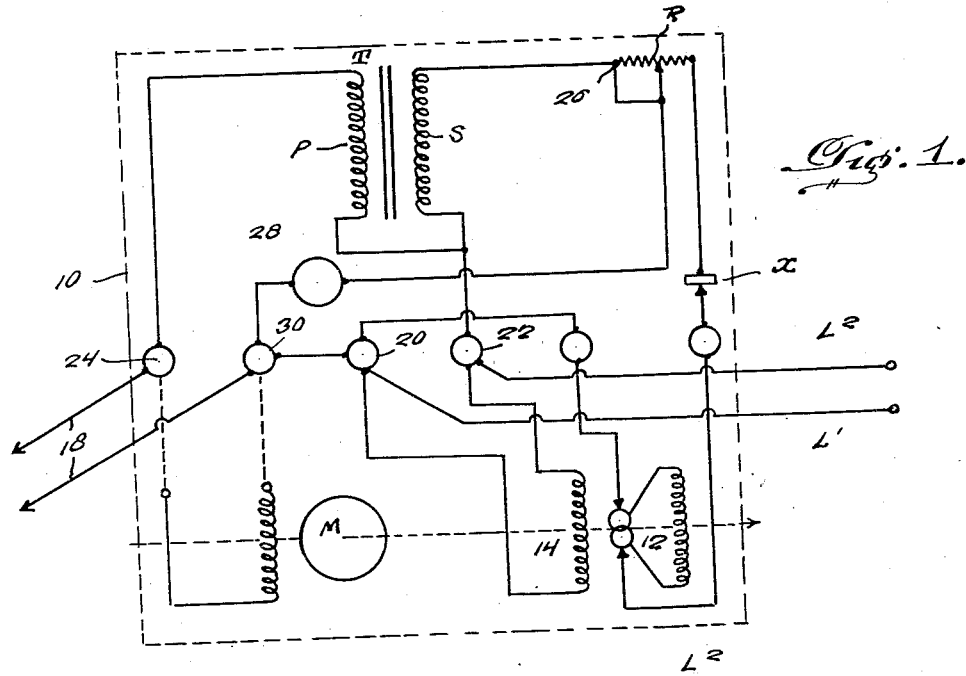
Figure 1 is a diagrammatical view of a practical hookup of the components of the automatic controller, in accordance with the invention.
Figure 2:
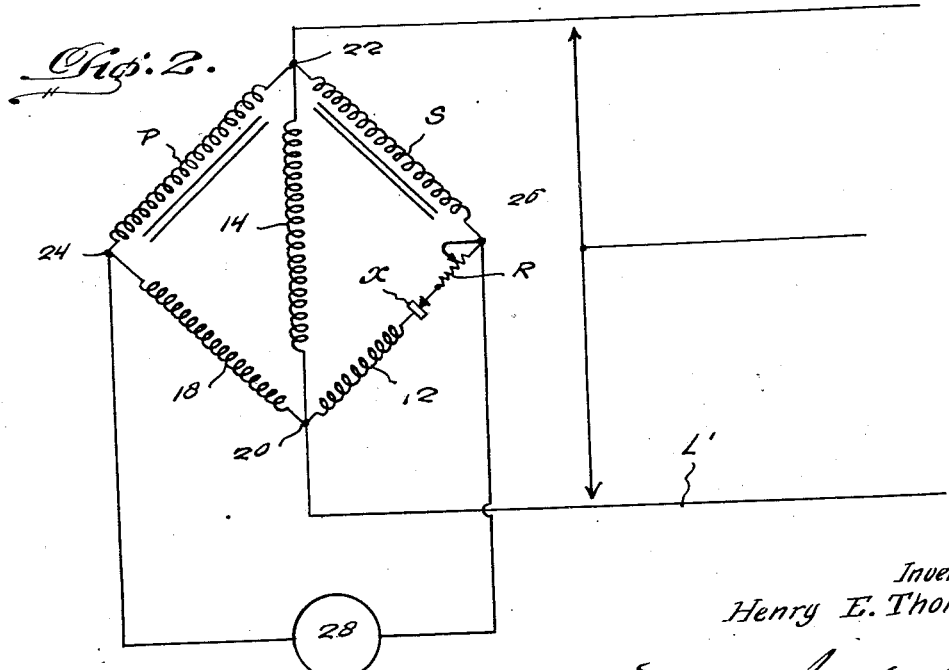
Figure 2 is a schematical view of the controller hookup of Figure 1, showing the bridge arrangement of the components thereof to operate on a single phase consumer's service line.

Referring to the drawings in detail, and more particularly to Figures 1 and 2, the invention, as it is exemplified therein, is comprised in a control panel 10, upon which the several components, or instrumentalities, of the power factor controller may be conveniently mounted, one of the same taking the form of a normally balanced bridge (Figure 2), having one of its arms constituted in the primary P, of a transformer T; its second arm, in the secondary S of the transformer; its third arm, in a rheostat R having its resistance connected in series with a rectifier X and the D.-C. exciter field 12, of a single phase alternator 14; and its fourth arm, in the consumer's load 18. One lead $L^1$, of the service line, is connected to a terminal 20, that is common to one side of the load 18 and one end of the D.-C. exciter field 12, while the other lead $L^2$ thereof is connected to a terminal 22, that is common to one end each of the primary P and the secondary S, of the transformer T; the two terminals 20 and 22 being bridged by the output from the alternator 14. The remaining end of the primary P and that of the resistance of the rheostat R are connected to a common terminal 26; the two terminals 24 and 26 being bridged by a meter 28.

As shown in Figure 1, an induction motor M is direct connected to the rotor of the alternator 14 and has one of its terminals electrically connected to a terminal 30 interposed between the meter 28 and the connected side of the load 18 and its other terminal similarly connected to the terminal 24, that is interposed between the other side of the load 18 and the primary P. Here, the D.-C. exciter field 12 has one terminal 32 connected to the rectifier X and its other terminal 34 connected to the terminal 20, the latter, in turn, being connected to the terminal 30.

In operation, if a voltage drop occurs at the terminals 24 and 30, current passing through the primary P, of the transformer T, will increase and will be followed by an increase of current and voltage in the secondary S, which will cause a rise in the excitation of the exciter field 12, when the output of the alternator 14, will increase at the terminals 20, 22, and 24, 30, in just an amount to restore power factor unity on the load 18. Contra, should there be a voltage rise at the terminals 24 and 30, current will lower through the primary P and both current and voltage will likewise lower in the secondary S, reducing the excitation of the exciter field 12 and the output of the alternator 14 until the system, i. e., bridge, balances. During the period of bridge balance, i. e., unity power factor, the alternator 14 operates as a synchronous motor, taking its excitation from the line, but, as long as the voltage is high and the current is low, the alternator absorbs voltage and supplies current to automatically restore balance to the bridge.

The motor M operates as a starter to bring the alternator 14 up to synchronous speed, so that it can be placed in the line in step with the line voltage, after which, the motor is not needed. The meter 28 is an A.-C. type, normally reading in terms of A.-C. volts, but, for present purposes, the scale is calibrated to read in per cent power factor—zero equals one hundred per cent power factor, or unity, and this is indicated when the bridge is in balance. The rheostat R controls the excitation of the alternator 14, by adjusting the current flow through the exciter field 12, thus controlling the lagging or leading current, i. e., power factor, of the circuit.

The controller, as thus provided, will function with substantially equal efficiency on two phase and three phase power lines, as long as a proper phasing of the connections is adhered to, and, when employed on these power lines, one controller unit, with its components, is required for each phase. In the case of a two phase hookup, the starting motor M must be of a two phase type and, in the case of a three phase hookup, it must be of a three phase type. In both cases, however, the alternator 14 must be of a single phase type.

As shown in Figure 3, the two controller units are in common connection at the terminal 20a, to which the common return lead L³, of both the service and load lines, is connected, while one phase lead L⁴, of the service line, is connected to the terminal 22a, of one of the units, and the other phase lead L⁵ thereof is connected to the terminal 22b, of the second unit. One phase lead 18a, of the load line, is connected to the terminal 24a, of the first of the controller units, and the other phase lead 18b to the terminal 24b, of the second of the controller units.

Referring now to Figure 4, showing the controller arrangement for a three phase consumer's service line including a delta load 36, it will be seen that one controller, i. e., bridge, with its components, is provided for each phase, and that each of the service line leads L⁶, L⁷, and L⁸, connects with a terminal 22c of each bridge; while a lead 18d connects the terminal t¹, of the delta load 36, with the terminal 24c of the lowermost of the bridges; a lead 18e, the terminal t², of the delta load, with the terminal 20c of the same bridge; and a lead 18f, the terminal t³, of the delta load, with the terminal 24c of the uppermost of the bridges. A lead 18g connects the delta load lead 18d with the terminal 20c of the uppermost of the bridges; while a lead 18h connects the delta load 18e with the terminal 24c of the intermediate bridge, and a lead 18i connects the delta load lead 18f with the terminal 20c of the intermediate bridge.

In operation, the rheostat, or rheostats, R will be adjusted to place each bridge in balance, in which state, the meter 28 will indicate zero, i. e., one hundred per cent power factor, and thereafter each bridge, with its components, will function automatically to maintain the power factor at unity. With each alternator 14 brought up to synchronous speed, the starting motor, or motors, M, may be permitted to idle by being disconnected from the line, or be dispensed with entirely by being both disconnected from the line and from the shaft of the rotor of the alternator, or alternators, 14.

Without further description, it is thought to be obvious that the controllers are designed for permanent association with single or multiphase A.-C. power service lines, and that the meter, or meters, 28 may be calibrated for voltage and current readings, in lieu of power factor reading.

What I claim is:

1. A power factor controller for an alternating current circuit, comprising a balanced bridge connected to said circuit, an alternator having its output connected across opposite terminals of said bridge to supply compensating current to said circuit when the bridge is unbalanced due to variations in load on the circuit causing changes in current and voltage and lowering power factor, and an exciter field for said alternator adapted to receive direct current from one side of said bridge, said alternator operating as a synchronous motor by taking its exciting current from said circuit when said bridge is restored to balance.

2. In an alternating current system of distribution, including a consumer's service line and a consumer's load line, a balanced bridge connected to and between said lines, an alternator having its output connected across opposite terminals of said bridge to supply compensating current to said load line when the bridge is unbalanced due to variations in current and voltage and lowering power factor, and an exciter field for said alternator adapted to receive direct current from one side of said bridge, said alternator operating as a synchronous motor by taking its exciting current from said service line when said bridge is resorted to balance.

3. A power factor controller for an alternating current circuit, comprising a balanced bridge connected to said circuit, said bridge including a transformer having its primary connected in on one side of the bridge and its secondary in on the opposite side thereof, an alternator having its output connected across opposite terminals of said bridge to supply compensating current to said circuit when the bridge is unbalanced due to variations in load on the circuit causing changes in current and voltage and lowering power factor, an exciter field for said alternator, and a rectifier in series with said secondary for supplying direct current to said exciter field when said bridge is unbalanced due to lag or lead in the line current, said alternator operating as a synchronous motor by taking its exciting current from said circuit when said bridge is restored to balance.

4. The invention as in claim 1, with a starting motor connected to said circuit and to said alternator.

5. The invention as in claim 2, with a single phase motor connected to said load line and operatively connected to said alternator.

6. The invention as in claim 3, with a rheostat connected in on the secondary side of said bridge for regulating the excitation of said alternator.

HENRY E. THOMAS.

REFERENCES CITED

The following references are of record in the file of this patent:

UNITED STATES PATENTS

| Number | Name | Date |
|---|---|---|
| 716,429 | Kelly | Dec. 23, 1902 |
| 2,040,684 | Boyajian | May 12, 1936 |
| 2,316,008 | Ludbrook | Apr. 6, 1943 |